US006594621B1

(12) United States Patent
Meeker

(10) Patent No.: US 6,594,621 B1
(45) Date of Patent: Jul. 15, 2003

(54) SYSTEM AND METHOD FOR DETERMINING CONDITION OF PLANT

(76) Inventor: James H. Meeker, 123 Fairchild Ave., Morris Plains, NJ (US) 07950

( * ) Notice: Subject to any disclaimer, the term of this patent is extended or adjusted under 35 U.S.C. 154(b) by 0 days.

(21) Appl. No.: 09/519,630

(22) Filed: Mar. 6, 2000

(51) Int. Cl.[7] .............................................. G06F 17/00
(52) U.S. Cl. ........................ 702/185; 702/184; 702/183
(58) Field of Search ................... 702/182–185, 702/24, 33–36, 40–43, 81–84, 103, 104, 105, 108, 113–115, 127, 141, 187, 188, FOR 141, FOR 151, FOR 170, FOR 171, FOR 116–FOR 118, FOR 123–FOR 126, FOR 134–FOR 137; 340/679, 680, 682, 683; 73/570, 602, 649, 659–661, 118.1; 235/375, 376, 462.01, 462.11, 462.13, 462.14, 462.15, 462.45, 462.46, 472.01–472.03; 345/965–970; 701/31–35; 700/108–110; 346/33 MC

(56) References Cited

U.S. PATENT DOCUMENTS

| 4,537,067 A | | 8/1985 | Sharp et al. ............. 73/152.13 |
|---|---|---|---|
| 4,612,620 A | | 9/1986 | Davis et al. ................. 702/184 |
| 4,835,372 A | | 5/1989 | Gombrich et al. .......... 235/375 |
| 4,885,707 A | | 12/1989 | Nichol et al. ................... 702/56 |
| 5,412,400 A | * | 5/1995 | Takahara et al. ............ 345/965 |
| 5,541,840 A | | 7/1996 | Gurne et al. .................. 701/33 |
| 5,557,549 A | | 9/1996 | Chang ......................... 702/183 |
| 5,724,261 A | * | 3/1998 | Denny et al. ................ 702/184 |
| 5,808,903 A | | 9/1998 | Schiltz et al. .................. 702/56 |
| 5,856,931 A | * | 1/1999 | McCasland ................. 702/184 |
| 5,963,884 A | * | 10/1999 | Billington et al. ............. 702/56 |
| 6,006,164 A | * | 12/1999 | McCarty et al. ............... 702/33 |
| 6,006,171 A | * | 12/1999 | Vines et al. .................. 702/184 |
| 6,078,874 A | * | 6/2000 | Piety et al. .................... 702/56 |
| 6,125,868 A | * | 10/2000 | Murphy et al. ................ 702/33 |
| 6,192,325 B1 | * | 2/2001 | Piety et al. .................. 702/184 |
| 6,220,098 B1 | * | 4/2001 | Johnson et al. ............... 73/660 |
| 6,297,742 B1 | * | 10/2001 | Canada et al. ............... 340/683 |
| 6,336,053 B1 | * | 1/2002 | Beatty ......................... 345/967 |
| 6,371,375 B1 | * | 4/2002 | Ackley et al. ......... 235/462.45 |

OTHER PUBLICATIONS

MSI web pages (6 pp.): About MSI, WebView 2000, and Electronic Data Loggers (publication dates unknown).
Tiscor web pages (13 pp.) concerning PROTRAC TaskMaster, corporate profile, and MEDI–MIZER (publication dates unknown).
Oliver Interactive web pages (12 pp.) concerning CBM Optimizer and EXAKT (publication dates unknown).

* cited by examiner

Primary Examiner—Hal Wachsman
(74) Attorney, Agent, or Firm—Thomas L. Adams

(57) ABSTRACT

The system and method can determine the condition of a plant, its equipment and facilities, at inspection sites identified by identification codes. A portable processing device with an inspection transducer can sense and store at least one measured characteristic of the plant equipment. This device can also read at least one of the identification codes of the plant equipment. A central processing system can communicate with and upload from the portable processing device at least measured characteristics and identification codes. The central processing system can, in response to at least one measured characteristic and at least one of the identification codes, produce a condition signal signifying the condition of some aspect of the plant.

41 Claims, 2 Drawing Sheets

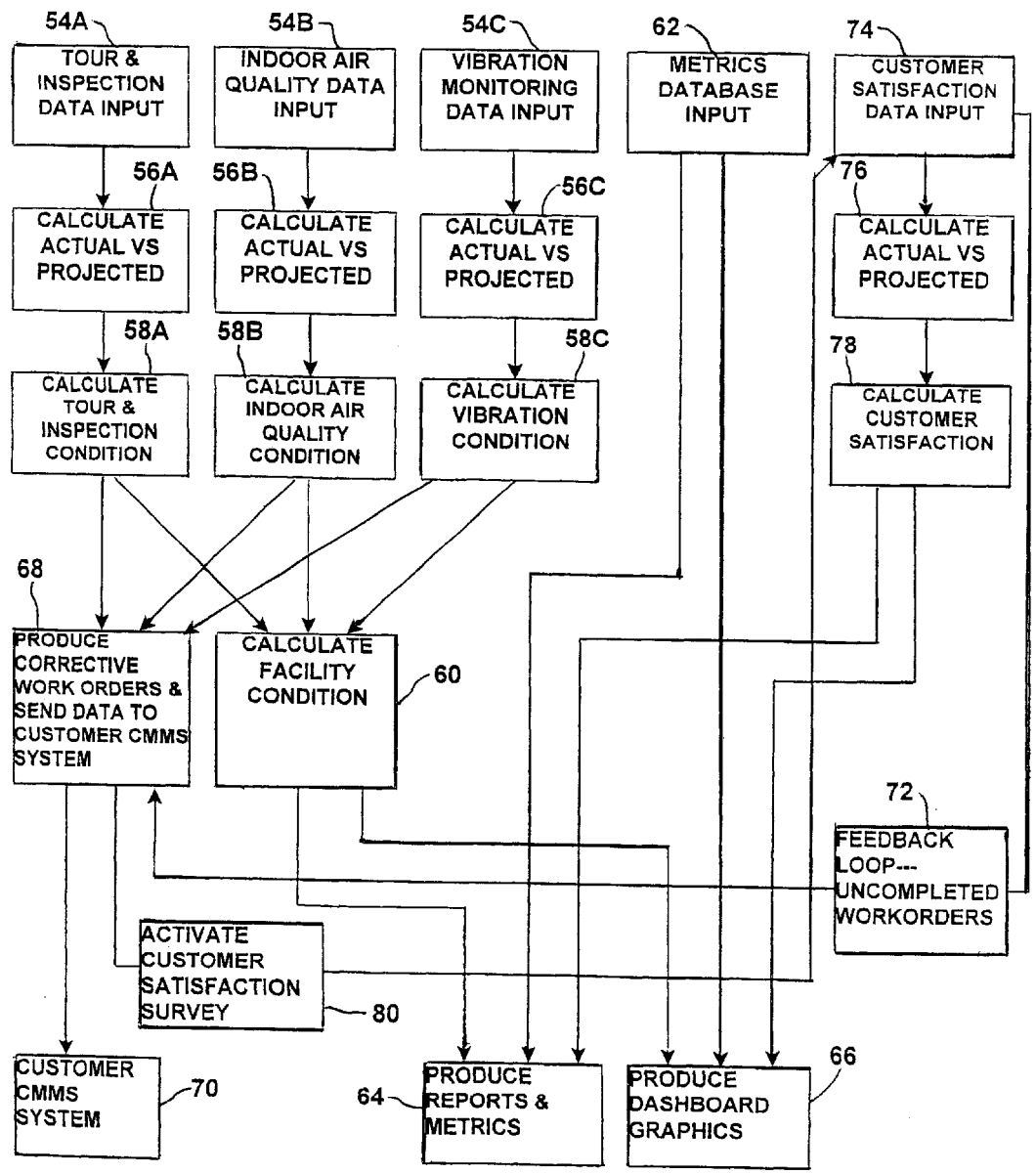

SYSTEM AND METHOD FOR DETERMINING CONDITION OF PLANT

BACKGROUND OF THE INVENTION

1. Field of the Invention

The present invention relates to plant monitoring equipment, and in particular to systems and methods for determining the condition of a plant with a portable processing device and a central processing system.

2. Description of Related Art

Current techniques for operating and maintaining facilities utilize one or more methodologies: "Breakdown" maintenance, or run-to-failure maintenance, is event based and awaits a failure before making repairs. "Preventive" maintenance is time based, with repairs or replacements being made on a scheduled basis. "Proactive" maintenance requires that the root-cause-of-failure-modes be understood and eliminated to prevent failure modes from occurring. "Reliability centered" maintenance assigns a risk value to each piece of equipment and sub-component so that maintenance and monitoring can be tailored to reduce risks to acceptable levels.

"Condition based" maintenance (also referred to as predictive maintenance or just-in-time maintenance) waits for an identified need for maintenance before doing that work. This type of maintenance is based on the concept that measurement of the equipment's condition will indicate the need for repair activity. This technique can be combined with other techniques to achieve "strategy assessment" maintenance, which requires a theoretical analysis of estimates, assumptions and methods of measurement to provide the most effective mix of breakdown, preventive, predictive and proactive maintenance and methodologies.

In U.S. Pat. No. 4,612,620 hand-held device 10 (FIG. 1) connects to a vibration transducer 18. An operator can take measurements using the transducer, based upon promptings from a test sequence stored in the hand-held device 10. The operator can record qualitative observations by entering code numbers corresponding to predetermined conditions. Afterward, device 10 is taken to a central processor where these test results are uploaded and where a new set of test procedures are downloaded. This reference takes very limited data, does not have an efficient way for quickly identifying the measurement site, and is not generally set up for condition based monitoring of an entire plant.

In U.S. Pat. No. 4,835,372 a number of remote units having bar code scanners are connected in a network to a central computer in a hospital. These remote units may in some cases be hand-held devices connected to the network by an R. F. link. Bar codes are placed on a patient's bracelet and on a badge carried by nurses and other hospital personnel. Bar code labels are printed for patient's specimens, special drugs etc. By scanning bar codes on the patient's bracelet, the nurse's badge, and on the drugs being administered, these central computer can keep track of the drugs being administered. The central computer can also send a signal to the remote units to notify a nurse of the need to administer a scheduled or overdue drug. The remote units can also have sensor inputs for monitoring blood pressure, temperature, respiration, etc. Alternatively, an operator can type this data into the remote unit instead. This system is not involved with condition based monitoring of a plant.

In U.S. Pat. No. 5,541,840 a hand-held unit 10 can either operate with, or operate independently of, master unit 14 at an automobile repair facility. Hand-held unit 10 can also travel and record test data, while an automobile is taken for a test drive. Thereafter, the hand-held unit 10 can be disconnected from the automobile and connected to master unit 14 for diagnosis. Also, master unit 14 can download test procedures to hand-held unit 10. Again, the system takes very limited data, is unconcerned with identifying various inspection sites, and is not adapted for condition based monitoring.

See U.S. Pat. No. 5,808,903 for a sound card in a PCMCIA slot of a portable computer that collects vibration data from an accelerometer and performs a fast Fourier transform on the collected data. See U.S. Pat. No. 5,557,549 for an expert system for diagnosing maintenance problems. See also U.S. Pat. No. 4,537,067.

Accordingly, there is a need for an improved system and method for monitoring conditions at a plant and efficiently presenting information that would be useful for maintenance purposes.

SUMMARY OF THE INVENTION

In accordance with the illustrative embodiments demonstrating features and advantages of the present invention, there is provided a system for determining the condition of a plant, its equipment and facilities, at a plurality of inspection sites identified by a plurality of separate, machine-readable, identification codes. The system has at least one portable processing device with an inspection transducer adapted for sensing and storing in the processing device at least one measured characteristic of the plant equipment. The portable processing device is operable to read at least a selected one of the identification codes associated with the plant equipment. Also included is a central processing system adapted to communicate with and upload from the portable processing device at least the one measured characteristic and at least the selected one of the identification codes. The central processing means is operable in response to at least the one measured characteristic and at least the selected one of the identification codes to produce a condition signal signifying the condition of some aspect of the plant, in response to at least the one measured characteristic and at least the selected one of the identification codes.

In accordance with another aspect of the invention a method is provided that employs a central processing system and at least one portable processing device with an inspection transducer for determining the condition of a plant at a plurality of inspection sites identified by a plurality of separate, machine-readable, identification codes. The method includes the step of sensing and storing in the processing device at least one measured characteristic of the plant by using the inspection transducer. Another step is reading with the portable processing device at least a selected one of the identification codes associated with the inspection sites. The method also includes the step of communicating with and uploading from the portable processing device at least the one measured characteristic and at least the selected one of the identification codes using the central processing system. Also included is the step of producing with the central processing system a condition signal signifying the condition of some aspect of the plant, in response to at least the one measured characteristic and at least the selected one of the identification codes.

Systems and methods according to the principles of the present invention offer a highly cost-effective and unique program for the operation and maintenance of various buildings and grounds facilities. Several current or state-ofthe-art technologies may be used in unique ways to achieve greater economies from the operations and maintenance labor and materials resources, while providing a more effective method of tracking the facilities condition. The resulting improved utilization of resources is preferably combined with the continuous, automated tracking of the facilities condition, and can integrate several technologies to provide a continuous, single loop feedback control system for the operation and maintenance of a facility.

The preferred system utilizes the technologies of condition based maintenance, such as, but not limited to, measuring vibration, ultrasound, infrared, ferrography wear particle analysis, etc. While conventional condition based maintenance concentrates primarily on monitoring the conditions of equipment, the preferred system will utilize technology to monitor, take corrective action and update the condition of the entire facility; including equipment, architectural features, finishes, furniture, housekeeping cleanliness, structural features, walls, roofs, grounds, roads, parking lots, sidewalks and curbs. Unlike the condition based maintenance technologies mentioned, the preferred system also collects non-equipment data utilizing a hand-held computer with bar code scanner. Data can be continuously collected into a preferred database program regarding the condition of the entire facility and then compared to a standard. Whenever the program detects a substandard condition, preferably a corrective work order is automatically generated. In the preferred embodiment, the condition of the area being monitored is continuously updated by the program.

The preferred system and methods can reduce maintenance labor required to maintain a facility by limiting the labor force to pre-identified work only. Also, the staff labor required to maintain a facility can be reduced preferably by automating data collection. This continuous collection of facilities maintenance and condition data will increase knowledge of the condition of the facilities. Management effectiveness is increased through the reduction and presentation of facilities maintenance and condition data in a preferred, concise, graphical format. Also, this system and method can provide feedback information on an independent audit basis; that is, the data can be collected independently from the maintenance repair function. This independence fosters highly specialized skills that are more able to adapt to the latest technologies.

BRIEF DESCRIPTION OF THE DRAWINGS

The above brief description as well as other objects, features and advantages of the present invention will be more fully appreciated by reference to the following detailed description of presently preferred but nonetheless illustrative embodiments in accordance with the present invention when taken in conjunction with the accompanying drawings, wherein:

FIG. 2 is an operating system logic diagram schematically illustrating a method performed by the system of FIG. 1.

DETAILED DESCRIPTION OF THE PREFERRED EMBODIMENTS

Figure 1:
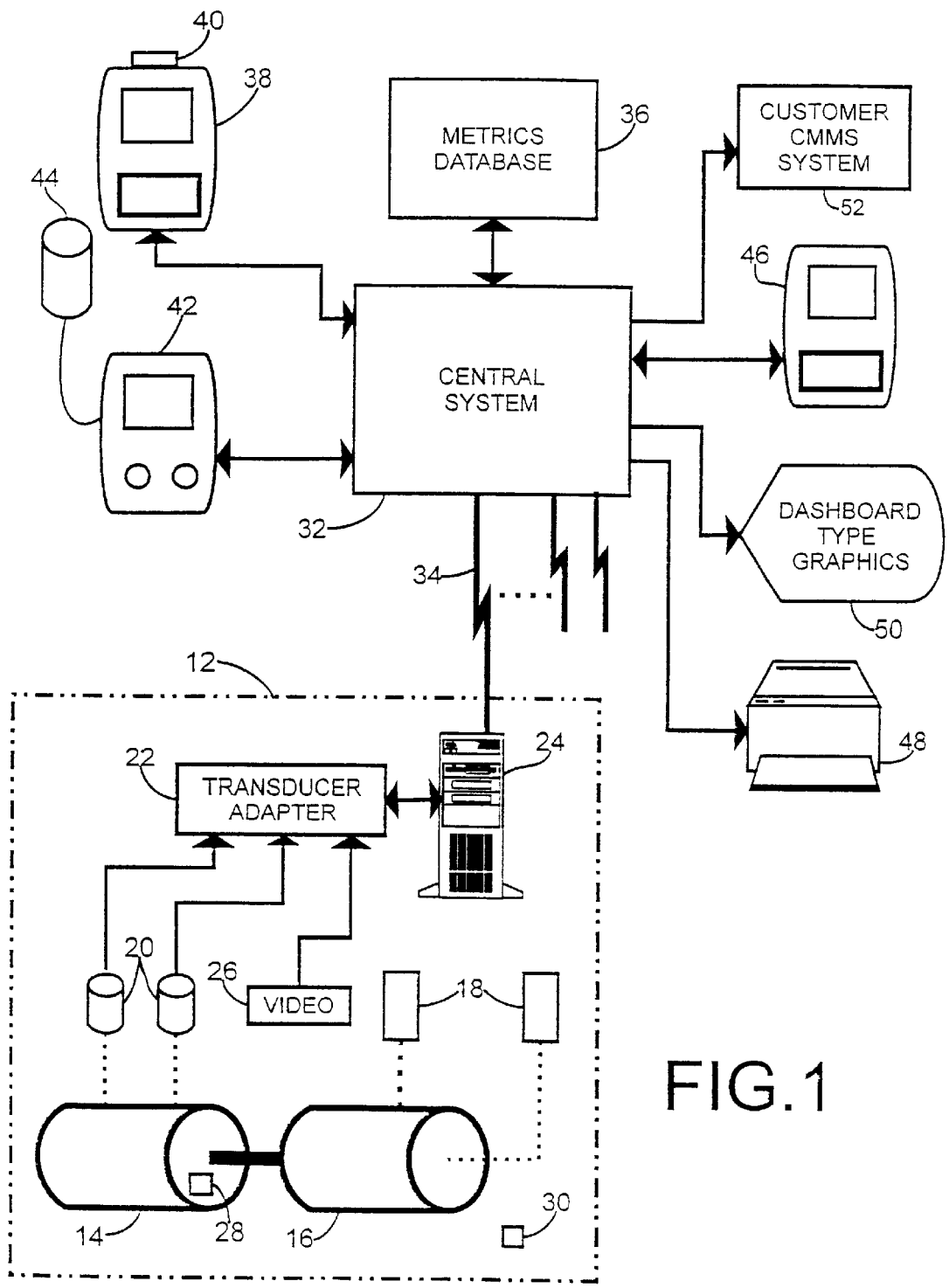
FIG. 1 is a block diagram of a system in accordance with principles of the present invention.

Referring to FIG. 1, an inspection site 12 is schematically illustrated having equipment 14 and 16. Equipment 14 and 16 can be any one of a variety of devices such as: pumps, blowers, generators, circuit breakers, switches, valves, pneumatic or hydraulic cylinders, motors, dampers, etc. Indeed, there is no limitation upon the type of equipment that can be monitored by the present system.

A plurality of remote transducers 18 are shown coupled to a piece of equipment 16. Transducers 18 can measure any one of a variety of parameters such as: pressure, temperature, humidity, fluid level, current, voltage, vibration, stress, noise level, height, speed, acceleration, light level, weight, color, size, etc. In some cases transducers 18 will be used to monitor the state or position of a control device such as a valve or switch in order to produce a signal indicating whether the switch is on or off or whether the valve is open and to what extent it is open. Indeed, there is no limitation upon the type of parameter that can be monitored by the present system. Transducers 18 typically produce an electrical output and have a connector adapted to connect to a portable processing device that will be described presently.

Transducers 18 can in some instances be a simple transducers such as a thermocouple for producing an electrical output in response to temperature. In the simplest case, the electrical contacts of an electrical machine can be exposed for temporary connection to monitoring clips that are part of a portable processing device. In more complex cases, transducers 18 may include analog to digital converters providing inputs to dedicated microprocessors whose communications ports are adapted to connect to a portable processing device employing a specific communications protocol. The connection to a portable processing device may be wireless and employ an infrared transmitter or other wireless device.

Remote transducers 20 are similar to previously mentioned transducers 18 except that transducers 20 are connected to a transducer adapter 22. Adapter 22 may be an input/output card that is part of a remote processing system, shown herein as a local computer 24 Computer 24 can be any one of a variety of commercially available monitoring systems designed to measure and transmit various operating parameters of an industrial process. In this preferred embodiment, computer 24 may be a personal computer, and may optionally include a monitor, keyboard and mouse (not shown).

An imaging device is shown herein as a video camera 26 connected to adapter 22. In other embodiments video output will be sent to a separate graphics card designed to handle video, and which is installed in a separate computer dedicated to handling this video input. In preferred embodiments camera 26 will be used to take periodic "snapshots" of equipment 14 and 16, or other portions of the facility. In still other embodiments, camera 26 may be used to send real-time streaming video.

In preferred embodiments, camera 26 will take still images of slowly changing aspects of the facilities such as carpets, walls, windows, doors, furniture, etc. The still images can be stored for later retrieval months or years later to allow an objective comparison of how the facilities have changed over time.

In some embodiments a number of low-cost cameras will be placed at strategic locations to capture images of relevant equipment or facilities. In other embodiments, the camera can be panned in order to record a panoramic view of various aspects of a facility. In still other embodiments, a portable camera can be carried by an operator who records either still images or a panning shot of a facility for later storage in a central processing system, that will be described hereinafter.

Equipment 14 is shown marked with a device 28 having a machine-readable identification code. In some embodiments, device 28 will be a simple bar code. In other embodiments, device 28 may be an identification transponder employing a passive circuit that can receive a radio frequency signal and return a modulated signal, that is encoded to identify a specific inspection site. Another device 30 is shown located in the general area 12 to identify the room in which equipment is located, as opposed to the specific equipment in the room.

The foregoing equipment together with central processing system 32, its accessories and its peripherals, is part of a system for determining the condition of a plant. Central processing system 32 may be a mainframe computer, mini-computer, a computer server or in some cases a personal computer. Central system 32 is connected by link 34 to previously mentioned, remote processing system 24. Link 34 may be a conventional network communications channel employing well-known protocols such as ethernet, token ring or other protocols. In other embodiments, a link may be made through an Internet connection. In some embodiments, link 34 may be cable, twisted pair, or a wireless connections such as a radio frequency link. Link 34 is shown as one of a plurality of links that are connected to a number of inspections sites, such as inspection site 12. These multiple inspections sites, together with the associated facilities and equipment, as well as the building containing all of this, are herein referred to as the plant.

Central processing system 32 connects to a memory, shown herein as a metrics database 36. Database 36 will store the various measurements made under the procedures to be described herein. Database 36 will also contain a number of predetermined standards against which the measurements are judged in order to determine whether they are satisfactory. In some cases the standards will be a projection, created dynamically and based on other measured parameters, according to some linear equation or other more complex function. In some embodiments the function will be provided by a lookup table stored in database 36.

In the preferred embodiment, central system 32 can provide data to a customer's computerized maintenance management system (CMMS). A CMMS system is a known class of computerized systems for producing work orders for maintenance or other services at a plant. Typically a CMMS system will produce the work orders, although in some embodiments central processing system 32 can produce the work orders itself.

Portable processing device 38 is a conventional handheld computer having a screen and keyboard. Device 38 has a port adapted to connect to central processing system 32. The port may be a serial or parallel port, but in some embodiments may be a wireless connection accomplished through an infrared receiver/transmitter. In this embodiment, device 38 is fitted with a bar code reader 40 to allow the device to read the previously mentioned bar codes 28 and 30. For embodiments where identification transponders are employed, reader 40 will be replaced with a transmitter/receiver for stimulating the transponder and receiving its encoded return.

Device 38 can be carried to various inspections sites where an operator can either manually put in the site location or automatically feed the site information by means of bar code reader 40. Accordingly, device 38 may be programmed to prompt the operator with requests for inspection information. The operator can put in qualitative observations (a motor is quiet, all light bulbs are working, etc.). The operator may also be permitted to put in quantitative data obtained by either reading previously installed instruments, or by taking measurements with a separate measuring instruments. In some cases, the operator may also put in survey data by recording the responses of the facility's occupants to certain questions concerning recent service visits, and the adequacy of the equipment, facilities, building, etc.

Another portable processing device 42 temporarily connected to central processing system 32, is shown as an air quality monitor with an inspection transducer 44 that can measure air quality by detecting the level of $CO$, $CO_2$, $O_2$, etc. In this case device 42 is not a general-purpose processing device, but is an instrument dedicated to making and recording field measurements. Instead of measuring air quality, transducer 44 might measure noise, temperature, vibration, etc., from pieces of equipment or from the ambient environment. In still other embodiments, transducer 44 will be replaced by a connector that can connect to one of the previously mentioned transducers 18.

It will be appreciated that for some embodiments, inspection transducer 44 may be incorporated into a handheld computing device such as device 38, in which case then, a single type of portable device may be used for all circumstances. Also, devices 38 and 42 may be used with a complement of alternate inspection transducers. Thus when one wishes to measure vibration, a transducer suited for vibration measurements (for example, an accelerometer) will be substituted for any prior inspection transducer and will then be connected to the portable processing device.

Another portable processing device 46 is also shown temporarily connected to central processing system 32. Device 46 may be a simple handheld computing device having a port for connecting to system 32, but without any special transducers. In some embodiments, device 46 may be a laptop computer that connects to system 32 through a docking station. Device 46 can be used to download from system 32 various maintenance instructions that are formulated based on the measurements made by the other devices. A service technician can carry device 46 to various inspections sites, identify his/her location, and be prompted by device 46 with instructions for the appropriate service. In some embodiments, device 46 will be fitted with a bar code reader for scanning the identification codes at a specific inspection sites, so that device 46 can automatically respond with instructions that are appropriate for each site.

To facilitate an understanding of the principles associated with the foregoing apparatus, its operation will be briefly described in connection with FIGS. 1 and 2. An operator will initially connect portable devices such as device 38 or 42 to central processing system 32. System 32 will detect the presence of the portable device and download thereto an itinerary for the operator to follow.

Device 38 will display a message requesting the operator to visit a specific inspection site, for example, inspection site 12. Upon arriving at site 12, the operator can press an appropriate key on device 38 indicating the arrival at the specified destination. Alternatively, the operator can scan the bar code device 30 with scanner 40. In either event, device 38 will display a message requesting the operator to perform a particular measurement. For example, the operator may connect device 38 successively to the two transducers 18. After depressing an appropriate key, device 38 will download measurement data from these transducers.

Next, device 38 can display a message requesting the operator to perform another measurement. The operator can be instructed to use, for example, portable device 42 to perform an air quality measurement. This measurement can be stored automatically on device 42. Alternatively, the operator can read the measurement from device 42 and type the reading into device 38. The operator may also be instructed to use another measurement device such as a voltmeter, noise meter, vibration sensor, or the like. Again, the operator can type these measurements into the device 38 or enter these values via the scanner. Also, device 38 may request the operator to make certain observations and enter qualitative assessments of certain conditions, such as the condition of furniture, condition of housekeeping cleaning services, noise made by certain machines, reports of problems by building occupants, etc. The operator may also be requested to take survey information by interviewing occupants of the facility.

Note, it will be unnecessary for the operator to collect measurements made by transducers 20, since those transducers are regularly and automatically sending measurements through link 34 to central system 32. Nevertheless, the operator may make qualitative observations concerning equipment 14. In this case, the operator will indicate that such an observation is being made by scanning the bar code on device 38. It will be noted from the foregoing, that identification codes such as bar codes are not necessary for every inspection, but are an optional convenience for verifying the location of a measurement or observation.

Device 38 may now instruct the operator to visit another inspection site. Accordingly, the operator will leave site 12 and travel to this other site to perform operations similar to those just described.

After completing the itinerary specified by device 38, the operator will be instructed by device 38 to return to the home base where central processing system 32 is located. Device 38 will then be connected to system 32 and will then upload the information just collected. If also holding fresh information, device 42 will likewise be connected to system 32 in order to upload the new information to system 32.

System 32 will first store the uploaded information in database 36, as indicated in steps 54A, 54B, and 54C. Specifically, vibration data, indoor air quality, and other tour and inspection data and will be put into system 32 at this time. Next in steps 56A, 56B, and 56C, system 32 will compare the new data against a projected value. This projected value or standard can be based on a presumed trend or upon a trend observed from measurements obtained on previous tours. In any event, a comparison will be made based upon predetermined standards in database 36 or standards derived from formulas and other information stored in database 36. Any violation of the standards will likewise be recorded in database 36 for later reporting.

In steps 58A, 58B, and 58C system 32 will calculate the current conditions for indoor air quality, vibration, and other tour and inspection conditions. In step 60 the overall condition of the facility will be calculated. All data on conditions obtained by the foregoing steps will be stored as input in a metrics database 36 (FIG. 1) as shown in step 62 of FIG. 2.

Also, the new data will be applied to a number of equations or functions stored in database 36 to update the projections for the future conditions of the plant. The system may use current and previously collected data as input to these equations or functions. In some cases the functions may be implemented by a lookup table having multi-dimensional inputs. The system may use a variety of techniques for ascertaining whether conditions indicate a need for service or maintenance. Known techniques include combinational logic, logical ladders, fuzzy logic, and a variety of techniques used in existing expert systems. Also certain advanced systems may employ neural networks or other systems designed to learn from previous experience.

In step 64 system 32 may now be operated to produce reports indicating the condition of the plant under inspection. These reports will be produced using the metrics database input of step 62 together with the facility conditions calculated in step 60. System 32 will produce appropriate reports using printer 48 (FIG. 1). These reports may be bar charts, time lines, histographs, etc. These reports may be produced immediately after an inspection tour, or may be periodically produced on weekly or monthly basis as needed. Also, system 32 can produce graphical output on a monitor as schematically indicated by block 50. As shown in step 66 of FIG. 2, these graphics will be produced from the metrics database input of step 62 together with the facility conditions calculated in step 60.

Preferably, outputs will be a "dashboard" style. For example, the amount of vibration of a motor can be indicated with a "speedometer" display with a marginal sector marked in yellow and an unacceptable sector marked in red. Changes in data can be illustrated by displaying past readings in sequence to give a sense of how rapidly the equipment is moving toward a zone where corrective action will soon be necessary.

When used to the extent just described, the foregoing system offers a monitoring system that can be operated independently of the personnel performing service and maintenance in the plant. Accordingly, the personnel monitoring conditions will not have a bias that might otherwise exist with a person who will be required to perform work should an item be found deficient or in need of service or maintenance.

Nevertheless, the present system can issue instructions for service or maintenance. In step 68 of FIG. 2 the conditions previously calculated in steps 58A, 58B, and 58C are used to produce corrective work orders and also to send data to a customer's CMMS system (step 70). The work orders produced in step 68 can also be modified by a feedback loop 72 which reports uncompleted work orders found by the surveys of the facility's occupants (customers) conducted in step 74. The requirement for survey data may actually be triggered in step 80 by the issuance of work orders in step 68.

The survey data obtained in step 74 can be compared against projected values in step 76 and used to calculate actual satisfaction in step 78. The foregoing results can be used to modify or supplement the outputs produced in previously mentioned steps 64 and 66.

In some embodiments, orders for service or maintenance can be downloaded into portable device 46 (FIG. 1). These instructions will still be considered independent if they are delivered to personnel that are not involved in collecting the inspection data. Moreover, to the extent that the instructions are automatically produced, they will be deemed independent by management since these instructions are machine generated.

A technician actually performing the required maintenance or service can carry portable device 46 to a first location indicated in an itinerary downloaded by system 32 into device 46. As before, the technician can either manually acknowledge arrival at the destination or can use an internal bar code reader to automatically confirms such arrival. Upon arrival, device 46 will display the service or maintenance required at that location. The technician can later acknowledge that the required task was performed and put in appropriate additional comments or information, as may be requested by device 46. Thereafter, device 46 will instruct the technician to travel to another destination where additional tasks will be performed.

It is appreciated that various modifications may be implemented with respect to the above described, preferred embodiment. While a single central system is described, in other embodiments multiple central systems may be used and these may optionally communicate by appropriate links. Also, while a limited number of portable devices are shown, in other embodiments a greater or lesser number may be used. Furthermore, in some cases, a portable device may be used for several complete tours of the plant over the course of several days or weeks, before returning to the central system for uploading the newly acquired data. In other embodiments the portable devices may have a live wireless link to the central processing system in order to instantly update its database. In the latter case the portable device may receive new instructions "on the fly" to perform additional tests that appear to be required only because of indications given by the tests just performed.

Obviously, many modifications and variations of the present invention are possible in light of the above teachings. It is therefore to be understood that within the scope of the appended claims, the invention may be practiced otherwise than as specifically described.

What is claimed is:

1. A system for determining the condition of a plant, plant equipment and plant facilities, at a plurality of inspection sites identified by a plurality of separate, machine-readable, identification codes, the system comprising:
   at least one portable processing device having an inspection transducer adapted for sensing and storing in said at least one portable processing device a plurality of characteristics of said plant equipment, said plurality of characteristics corresponding to different qualities of said plant equipment, said at least one portable processing device being operable to record at least a selected one of the identification codes associated with said plant equipment; and
   a central processing system adapted to communicate with and upload from said at least one portable processing device the plurality of characteristics and said at least a selected one of the identification codes, said central processing system being operable in response to more than one of the characteristics and said at least a selected one of the identification codes to (a) calculate a plurality of current conditions based on said more than one of the characteristics, and (b) calculate an overall condition of said plant based on said plurality of current conditions to produce a condition signal signifying the overall condition of the plant, in response to more than one of the plurality of characteristics.

2. The system according to claim 1 wherein said condition signal signifies a proposed service to be performed at the plant to improve a condition at the plant.

3. The system according to claim 1 wherein said inspection transducer of the at least one portable processing device is adapted to measure air quality.

4. The system according to claim 1 wherein said at least one portable processing device is adapted to obtain at least one of the characteristics by electrically connecting to at least one piece of the equipment at the plant.

5. The system according to claim 4 wherein said at least one piece of equipment has a diagnostic transducer, said at least one portable processing device is adapted to connect to said diagnostic transducer in order to obtain at least one of the characteristics.

6. The system according to claim 1 comprising:
   an imaging device for capturing successive images of a portion of the plant for storage in said central processing system, so that changes in the plant can be compared visually.

7. The system according to claim 1 wherein said at least one portable processing device is operable to permit recording of non-quantitative observations of qualities of plant facilities that are substantially static in comparison to other periodically measured qualities.

8. The system according to claim 7 wherein said central processing system is operable to permit recording of data concerning qualities of plant equipment and of plant facilities that the plant equipment occupies.

9. The system according to claim 1 comprising:
   a remote processing system coupled to said central processing system and at least some of the plant equipment in said plant in order to send at least one operating parameter of the plant equipment to said central processing system for recording.

10. The system according to claim 9 wherein said remote processing system comprises:
    a remote transducer coupled to the plant equipment for measuring vibration.

11. The system according to claim 9 wherein said remote processing system comprises:
    a plurality of remote transducers coupled to nearby portions of the plant equipment; and
    a link for sending information from said plurality of remote transducers along a single path.

12. The system according to claim 1 comprising:
    a remote processing system coupled to at least some of the plant equipment in said plant in order to measure and record at least one operating parameter of the plant equipment, said remote processing system being adapted to communicate with and upload to said at least one portable processing device said at least one operating parameter.

13. The system according to claim 1 wherein said machine-readable identification codes comprise bar codes, and wherein said at least one portable processing device has a bar code reader.

14. The system according to claim 1 comprising:
    an identification transponder for transmitting said machine-readable identification codes, said at least one portable processing device having a transmitter-receiver for signaling said identification transponder and receiving and storing the transponder's identification code.

15. The system according to claim 1 wherein said central processing system is operable to produce reports facilitating comparisons of the condition of some aspects of the plant at different times.

16. The system according to claim 1 wherein said central processing system is operable to produce graphical presentations facilitating observations of trends in the condition of some aspects of the plant.

17. The system according to claim 1 wherein said central processing system has a memory holding at least one predetermined standard for some aspects of the plant, said condition signal being adjusted in accordance with satisfaction of or failure to meet said at least one predetermined standard.

18. The system according to claim 1 wherein said central processing system has a memory holding at least one predetermined function for producing the condition signal as a function of a measured condition of some aspects of the plant.

19. The system according to claim 18 wherein said central processing system comprises a memory holding a predetermined table for representing said at least one predetermined function.

20. The system according to claim 1 wherein said at least one portable processing device is operable to record during a follow-up tour an acknowledgement that a service was performed on said plant equipment.

21. The system according to claim 20 wherein the acknowledgement signifies confirmation said service was performed on said plant equipment.

22. The system according to claim 20 wherein the acknowledgement signifies occupant survey data concerning the condition of said plant.

23. A method employing a central processing system and at least one portable processing device with an inspection transducer for determining the condition of a plant at a plurality of inspection sites identified by a plurality of separate, machine-readable, identification codes, the method comprising the steps of:

sensing and storing in said at least one portable processing device a plurality of characteristics of said plant using at times said inspection transducer, said plurality of characteristics corresponding to different qualities of said plant at said plurality of inspection sites;

recording with said at least one portable processing device at least a selected one of the identification codes associated with said plurality of inspection sites;

communicating with and uploading from said at least one portable processing device the plurality of characteristics and said at least a selected one of the identification codes using the central processing system;

calculating (a) a plurality of current conditions based on said plurality of characteristics, and (b) an overall condition of said plant based on said plurality of current conditions; and producing with said central processing system a condition signal signifying the overall condition of the plant, in response to more than one of the characteristics.

24. The method according to claim 23 wherein the step of producing said condition signal is performed to signify a proposed service to be performed at the plant to improve a condition at the plant.

25. The method according to claim 23 wherein the step of sensing and storing said plurality of characteristics includes a measurement of air quality.

26. The method according to claim 23 wherein the plant has at least one piece of equipment, and wherein the step of sensing and storing said plurality of characteristics is performed at times by electrically connecting to said at least one piece of equipment at the plant.

27. The method according to claim 26 wherein said at least one piece of equipment has a diagnostic transducer, the step of sensing and storing said plurality of characteristics being performed at times by connecting to said diagnostic transducer of said at least one piece of equipment in order to obtain at least one characteristic of said plurality of characteristics.

28. The method according to claim 23 comprising the step of:

capturing successive images of a portion of the plant for storage in said central processing system, so that changes in the plant can be compared visually.

29. The method according to claim 23 comprising the step of:

recording with said at least one portable processing device non-quantitative observations of qualities of facilities that are substantially static in comparison to other periodically measured qualities.

30. The method according to claim 29 comprising the step of:

recording in said central processing system data concerning qualities of equipment and of facilities that the equipment occupies.

31. The method according to claim 23 comprising the step of:

sending from a remote measurement location at least one operating parameter of the plant equipment to said central processing system for recording.

32. The method according to claim 23 comprising the steps of:

measuring and recording at a location remote from said central processing system at least one operating parameter of the plant equipment; and communicating with and uploading to said at least one portable processing device said at least one previously recorded, operating parameter.

33. The method according to claim 23 comprising the step of:

producing reports facilitating comparisons of the condition of some aspects of the plant at different times.

34. The method according to claim 23 comprising the step of:

producing graphical presentations facilitating observations of trends in the condition of some aspects of the plant.

35. The method according to claim 23 comprising the step of:

adjusting said condition signal in accordance with satisfaction of or failure to meet a predetermined standard.

36. The method according to claim 23 comprising the step of:

producing the condition signal as a function of a measured condition of some aspects of the plant.

37. The method according to claim 36 wherein the step of producing the condition signal as a function is performed with a predetermined table representing a predetermined function.

38. The method according to claim 23 comprising the step of:

ascertaining whether conditions indicate a need for service or maintenance based on any one of the following techniques: combinational logic, logical ladders, fuzzy logic and techniques used in expert systems.

39. The method according to claim 23 wherein the plant has at least one piece of equipment, the method comprising the step of:

electively acknowledging during a follow-up tour that a service was performed on said at least one piece of equipment.

40. The method according to claim 39 wherein the step of electively acknowledging is performed to confirm said service was performed on said plant equipment.

41. The method according to claim 34 wherein the step of electively acknowledging is performed to record occupant survey data concerning the condition of said plant.

* * * * *